United States Patent
Shang et al.

(10) Patent No.: US 9,965,536 B2
(45) Date of Patent: May 8, 2018

(54) REPLICATION DESCRIPTION MODEL FOR DATA DISTRIBUTION

(71) Applicant: Sybase, Inc., Dublin, CA (US)

(72) Inventors: Heping Shang, Walnut Creek, CA (US); Randall L. Hughes, Centennial, CO (US); Yu Wang, Toronto (CA)

(73) Assignee: SYBASE, INC., Dublin, CA (US)

( * ) Notice: Subject to any disclaimer, the term of this patent is extended or adjusted under 35 U.S.C. 154(b) by 493 days.

(21) Appl. No.: 14/142,037

(22) Filed: Dec. 27, 2013

(65) Prior Publication Data

US 2015/0186484 A1    Jul. 2, 2015

(51) Int. Cl.
    *G06F 17/30* (2006.01)

(52) U.S. Cl.
    CPC .............. *G06F 17/30575* (2013.01)

(58) Field of Classification Search
    CPC ........ G06F 17/30371; G06F 17/30368; G06F 17/30292; G06F 17/30575; G06F 17/30578; G06F 17/30067
    See application file for complete search history.

(56) References Cited

U.S. PATENT DOCUMENTS

| | | | |
|---|---|---|---|
| 6,199,195 B1 * | 3/2001 | Goodwin | G06F 8/30 707/999.1 |
| 6,438,538 B1 | 8/2002 | Goldring | |
| 7,072,979 B1 * | 7/2006 | Aviani, Jr. | H04L 69/16 709/203 |
| 7,430,569 B2 | 9/2008 | Conrad et al. | |
| 7,587,435 B2 | 9/2009 | Shepherd | |
| 7,725,893 B2 | 5/2010 | Jaeckel et al. | |
| 7,814,459 B2 | 10/2010 | Behnen et al. | |
| 7,827,136 B1 * | 11/2010 | Wang | G06F 11/2094 707/610 |
| 8,121,978 B2 | 2/2012 | Wiss et al. | |
| 8,412,674 B2 | 4/2013 | Zhu et al. | |
| 8,566,371 B1 * | 10/2013 | Bono | G06F 17/30079 707/822 |
| 2003/0172331 A1 * | 9/2003 | Cherian | G06F 11/2092 714/712 |
| 2004/0098425 A1 * | 5/2004 | Wiss | G06F 11/2071 |

(Continued)

OTHER PUBLICATIONS

Extended European Search Report for European Application No. 14174861, dated Mar. 17, 2015, 7 pages.

(Continued)

*Primary Examiner* — Scott A Waldron
*Assistant Examiner* — Fatima Mina
(74) *Attorney, Agent, or Firm* — Sterne, Kessler, Goldstein & Fox P.L.L.C.

(57) ABSTRACT

A system, method and computer-readable mediums for replicating data, are provided. A replication logic description describing how data is replicated in a replication path and a resource description describing a replication environment are specified. The replication logic description is bound to at least one resource in the resource description. Once bound, an object representing a bound replication logic description and the resource description is generated and deployed in the replication environment. Once deployed the object replicates data in the replication path while ensuring transaction consistency and delivery during replication of the data.

21 Claims, 5 Drawing Sheets

(56) References Cited

U.S. PATENT DOCUMENTS

| | | | |
|---|---|---|---|
| 2005/0278346 A1* | 12/2005 | Shang | G06F 17/3033 |
| 2006/0089925 A1* | 4/2006 | Kumar | G06F 17/30433 |
| 2008/0301168 A1* | 12/2008 | Adler | G06F 17/30595 |
| 2011/0153562 A1 | 6/2011 | Howard et al. | |
| 2011/0153568 A1 | 6/2011 | Shang et al. | |
| 2011/0252124 A1* | 10/2011 | Bonner | H04L 67/1095 |
| | | | 709/224 |
| 2013/0031014 A1 | 1/2013 | Richter et al. | |
| 2013/0124464 A1 | 5/2013 | Rank et al. | |
| 2013/0159249 A1 | 6/2013 | Dewall et al. | |
| 2013/0159253 A1 | 6/2013 | Dewall et al. | |

OTHER PUBLICATIONS

"Getting Started with Oracle BPEL Process Manager", Oracle BPEL Process Manager Developer's Guide, 10g Release 2 (10.1.2), May 13, 2012, http://web.archive.org/web/20120513112957/http://docs.oracle.com/cd/B14099_19/integrate.1012/b14448/gsbpel.htm, retrieved Mar. 16, 2015, 18 pages.

"Kafka 0.8 Documentation", Apache Kafka, A high-throughput distributed messaging system, Aug. 15, 2013, http://web.archive.org/web/20130815195621/http://kafka.apache.org/documentation.html, retrieved Mar. 16, 2015, 21 pages.

* cited by examiner

REPLICATION DESCRIPTION MODEL FOR DATA DISTRIBUTION

BACKGROUND OF THE INVENTION

Systems, such as database, file and messaging systems generally require data to be replicated and stored in, for example, replication databases. Conventionally, to replicate data a user configures data that requires replication and then configures the low level network connectivity between a source server and destination servers. However, configuring low network connectivity is cumbersome and requires a user to needlessly spend time configuring servers in a network instead of defining and perfecting logic for data replication.

BRIEF DESCRIPTION OF THE DRAWINGS/FIGURES

The accompanying drawings, which are incorporated herein and form a part of the specification.

In the drawings, generally, like reference numbers indicate identical or functionally similar elements. Additionally, generally, the left-most digit(s) of a reference number identifies the drawing in which the reference number first appears.

DETAILED DESCRIPTION OF THE INVENTION

Provided herein are system, method and/or computer program product embodiments, and/or combinations and sub-combinations thereof, for configuring data replication in a database system.

Figure 1:
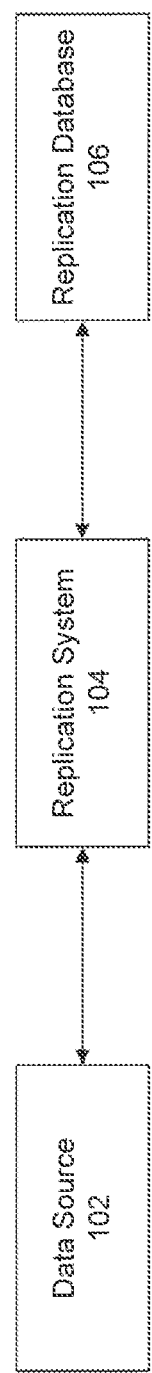
FIG. 1 is a block diagram of an exemplary replication system.

FIG. 1 is a block diagram of an exemplary system 100 that replicates data. System 100 includes a data source 102, a replication system 104, and replication data storage, such as a replication database 106. System 100 can include multiple data sources 102 that use replication system 104 to replicate data to multiple replication databases 106. For example, system 100 may include thousands of data sources 102 that use replication system 104 to replicate data to thousands replication databases 106. Components in replication system 104 may execute within a computer system, such as a computer system described in FIG. 5.

Data source 102 is a source of data that may or may not change over time. The data and its changes are replicated in system 100. Data source 102 may include, for example, and not limited to, any type of a database, a messaging queue, or file system. Data source 102 can execute on a server that is a computing device having a processor and a memory for executing and storing instructions. Such example computing device is discussed in detail in FIG. 5. Data source 102 may also include software, firmware and hardware or any combination thereof. The software may include one or more applications that create, delete and modify data definitions and the data stored in data sources 102.

A database is a data source that captures and stores data for applications or users. Data stored in a database can be defined, queried, updated, deleted or changed. A message queue is a data service that includes data on different topics. In an embodiment, messages in the message queue are in a form of structured data, such as Extensible Markup Language (XML) or JavaScript Object Notation (JSON). A file system can include different files that change with time.

In an embodiment, data definitions in data source 102 are defined by a developer. Example data definitions can include, and are not limited to, tables and schemas in databases, XML and JSON content in message queues, and file definitions in file systems. Data source 102 can receive transactions from a user via user input or another computing device that may manipulate the data definitions. Those transactions can also store, retrieve, modify, and manipulate data stored in data source 102.

Replication system 104 can replicate transactions in data source 102 to replication databases 106. Transactions can include changes to data and data definitions changes, table changes, schema changes, etc., to name a few examples. For example, replication system 104 may replicate changes to database tables and schemas caused by transactions in data source 102 to replication database 106 according to user specified replication logic. In one implementation, replication system 104 replicates data and changes in a database by subscribing to data or changes to the data in particular tables and then replicating the data. In another implementation, replication system 104 replicates data and changes in a message queue by subscribing to messages in a message queue using an identifier associated with a data topic. Once subscribed, replication system 104 can begin to receive messages with data or data updates that correspond to the subscribed identifier. In another implementation, replication system 104 replicates data in a file system by subscribing to changes in particular files and replicating the changes.

To replicate transactions, replication system 104 first determines which data logically should be replicated. For example, replication system 104 may receive user input as to which table and/or schema in a database should be replicated and may mark a table or a schema in a database as to be replicated based on user input. Replication system 104 can also describe how the data should be replicated, for example, and not limited to, how the schema should be replicated, or which columns in the schema should be replicated.

In another example, replication system 104 may describe how schema should be transformed as it is replicated from data source 102 to replication databases 106. For example, replication system 104 may describe which column in the schema may be merged with another column during the transformation.

In another example, replication system 104 may describe how schema should be subscribed to during replication. For example, replication system 104 may describe whether a subscription is for a column or a particular group of columns in the schema.

In another example, replication system 104 may describe how data should be published during replication. For example, replication system 104 may describe whether to publish values in a column of data that are equal to, below, or exceed a particular value, etc.

In another example, replication system 104 may subscribe to a topic, which is associated with data that should be replicated, in a message queue. In yet another example, replication system 104 may identify one or more files in a file system that that should be replicated.

A person skilled in the art will appreciate that examples above are not limiting and that other ways to describe how data may be replicated between data source 102 and replication database 106 may be used.

Once replication system 104 marks which data logically should be replicated, replication system 104 can also describe the environment that includes physical components that enable replication. For example, replication system 104 may describe servers that host data sources 102, replication databases 106, CPUs, memory storages that should have allocation and access to data, locations of servers, connectivity between servers, different security mechanisms required to connect to servers and extract data, etc.

Once the data is marked and the environment is configured, replication system 104 can monitor the marked tables, files, etc., for changes. For example, data source 102 may be a database that stores a record of transactions that change data in transaction logs. Example transaction log may be a text log, a database table, etc. In another example, changes to a file in a file system may be maintained in a file and then extracted from the file for replication.

Once replication system 104 receives transactions, replication system 104 can replicate these transactions to replication databases 106. The replication in replication system 104 is performed according to replication logic described above.

Replication database 106 can be a database that stores replicated data. Data in replication database 106 can be accessed by servers and applications. Replication database 106 can be hosted on a computing device, such as computing device discussed in detail in FIG. 5.

In an embodiment, replication system 104 guarantees transaction delivery and consistency. Transaction delivery guarantees that each transaction set up for replication by replication system 104 is to be replicated to replication database 106.

In an embodiment, replication system 104 guarantees atomic transaction delivery. In this case, each transaction is treated as a single unit. For example, transactions may include multiple components that form a unit once they are committed to a database or saved in a file in a file system. In one embodiment, replication system 104 guarantees transaction delivery of a unit, and not of individual components.

Replication system 104 can also guarantee transaction consistency. For example, replication system 104 may guarantee that the order of transactions that occur at data source 102 is to be maintained by replication system 104 when transactions are replicated to replication database 106. The data source 102 may be a file system, and, for example, a file may change in a first transaction in one way and may change in another way in a second transaction. When replication system 104 guarantees transaction consistency, replication system 104 can guarantee maintaining the order of transactions such that the first transaction is followed by the second transaction during replication.

Together, replication delivery and consistency guarantee ensures that replication system 104 replicates subscribed to transactions from data source 102 to replication databases 106 in the order that transactions occur in data source 102.

Database replication system 100 can also include a network (not shown). The network may be any type of a network or combination of networks such as, but not limited to, a local area network, a wide area network or the Internet. Network may be any form of a wired network or a wireless network, or a combination thereof. Network allows data source 102, replication system 104 and replication database 106 to communicate among each other.

In an embodiment, replication system 104 uses a replication description model ("RDM") to define what data to replicate from one or more data sources 102 to one or more replication databases 106 and how the replication is to be performed. For example, a system administrator may use RDM to define logic for replicating transactions and specify the physical descriptions connecting one or more data sources 102 and one or more replication database 106. RDM then automatically configures the environment that facilitates the replication process. Example environment may include network communication, memory storage (both memory allocation and data storage), recovery utilities, software components, and components that should be used to operate data sources 102 and replication databases 106, allocating servers from available grid of servers, server settings, etc., that should be used to transmit transactions from data source 102 and replication database 106.

Figure 2:
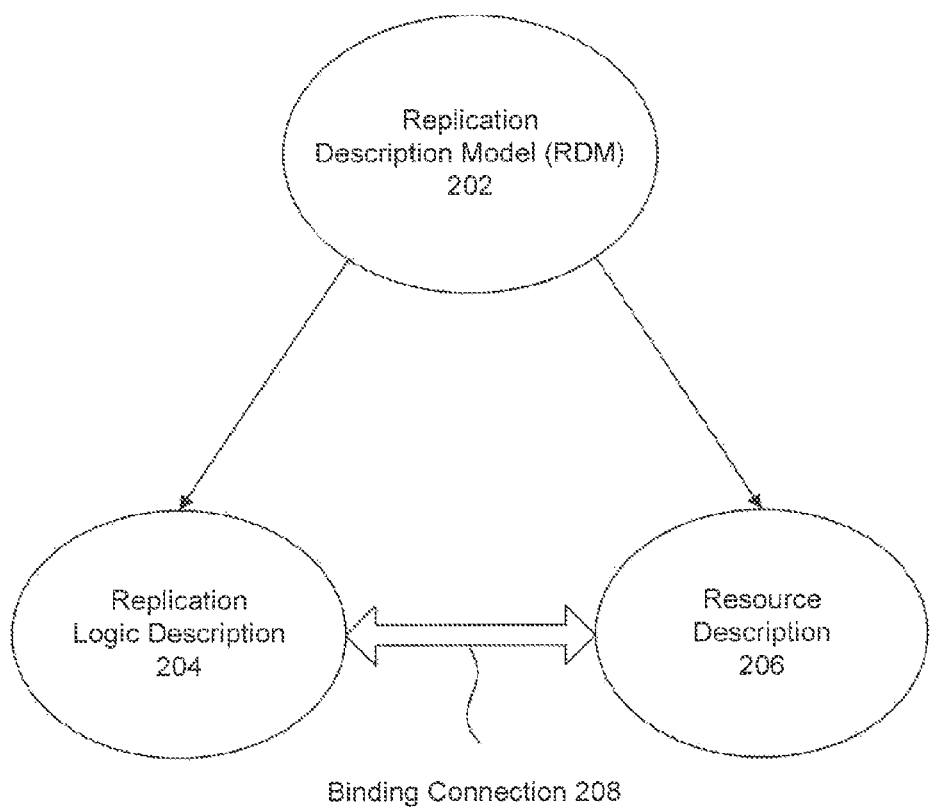
FIG. 2 is a block diagram of a replication description model, according to an embodiment.

FIG. 2 is a block diagram 200 of a replication description model, according to an embodiment. A replication description model 202 (RDM 202) allows users (e.g., system administrator) to define, using a high level language, a replication service between data source 102 and replication database 106. RDM 202 allows users to describe what data to replicate between data source 102 and replication database 106, and set up a physical environment that enables the defined replication. RDM 202 may be included in an application that executes within a computing system, such as a computing system discussed in FIG. 5. Components generated using RDM 202, discussed in FIG. 3, may then be uploaded to replication system 104.

In an embodiment, RDM 202 defines a replication service using a collection of entities in a tree structure with a single root entity. Each of the entities has a collection of named properties. Properties may be required and/or optional. Required properties contain definitions of an entity, such as an entity "type", a "parent" entity, an entity "name", and an entity "identifier" to name a few examples. In an embodiment, a property includes a collection of keys, where each key corresponds to a collection of values. The values may be of type "string", "numeric", or "entity reference" that references another entity, to name a few examples.

In an embodiment, RDM 202 includes a replication logic description 204, a resource description 206 and a binding connection 208. Replication logic description 204 can describe a logical data flow from data source 102 to replication database 106, how data is replicated along replication paths, enforces transactional consistency and delivery discussed above, and other service agreements, to give a few examples. Resource description 206 is a description of an environment, for example, as discussed in FIG. 1, that facilitates data replication and includes a description of physical servers, software included on the servers, server settings, server location, data containers, and other physical components that propagate data from data source 102 to replication database 106.

As illustrated below for exemplary purposes, replication logic description 204, resource description 206 and binding connection 208 are discussed in terms of entities in an XML format.

In an embodiment, replication logic description 204 describes a domain. A domain is a standalone subsystem that defines a replication path. A replication path is a path that includes data for replication from data source 102 to replication database 106. To logically describe replication, a replication path defines data sources and destinations in terms of publishers and subscribers. A publisher is a source that produces data that is replicated in the replication path and can be bound to data source 102, as described below. A subscriber is a destination that consumes the data in the replication path and can be bound to replication database 106. In an embodiment, a domain includes multiple publishers and subscribers, a single publisher and multiple subscribers or multiple publishers and a single subscriber.

In an embodiment, a replication path includes transactions performed on one or more tables, changes to database schemas, operation changes, etc. In another example, a replication path is also defined in terms of transactions that are not published. For example, a replication path may include all transactions from a publisher except for the transactions from a particular table, messages having a particular identifier, or from a particular file.

In an embodiment, transactions can be included or excluded from the replication path via a selector or a filter. Either a selector or a filter can be defined within a publisher or a subscriber. For example, a selector may select transactions from tables within the publisher. A filter can filter transactions in the replication path that are transmitted by the publisher or received by the subscriber.

A subscriber can subscribe to data in the replication path. In an embodiment, a subscriber subscribes to some or all data in the replication path.

In an embodiment, there are multiple replication paths in each replication service. When data from multiple replication paths is transmitted between the respective publishers and subscribers, RDM 202 can guarantee the transaction delivery and consistency for the data within each replication path, but not the data between multiple replication paths.

In an embodiment, replication logic description 204 is defined using structured or semi structured languages, such as XML, JSON, etc. An example of replication logic description 204 using XML is illustrated below:

```
<rdl:RepService name="myRep">
    <rdl:DataSet name="myData">
        <rdl:Publisher name="A">
            <rdl:TableFilter>not temp*<rdl:TableFilter/>
        </rdl:Publisher>
        <rdl:Subscriber name="B">
        </rdl:Subscriber>
    </rdl:DataSet>
</rdl:RepService>
```

In the example above, a term "DataSet" describes the data that should be replicated in the replication path, which a user names "myData." Inside the "DataSet," replication logic description 204 includes a "Publisher" which is set to source "A" and a "Subscriber" which is set to destination "B." Also, the example above uses a data transformation filter, such as a "TableFilter." A "TableFilter" is a table filter that filters out transactions from tables. In the example above, the table filter filters out data from table(s) "temp*" from being replicated to subscriber B. A table filter may also be a filter at a more granular level and filter out data within a particular table as well.

In another example, replication description logic 204 includes a "SchemaFilter" that filters out a particular schema or schemas from replication.

In another example, a filter may cause transformations as data is replicated along replication path, such as, remove, add or rename columns in a table as the data is replicated from data source 102 to replication database 106. In this case, when a transaction from data source 102 is received by replication system 104, a filter can cause a transformation of data in the transaction according to the definitions set in the filer. Once the transformation completes, replication system 104 transmits the transformed data to replication database 106.

In an embodiment, replication logic description 204 may be defined using a DN-Value format (distinguished names format) that may be used to provide a unit name to an entity. In the example below, the logic described using XML above is illustrated using a DN-Value format below:

```
RepService:myRep.DataSet:myData
myRep.myData.Publisher:A
myRep.myData.A.TableFilter           "not temp*"
myRep.myData.Subscriber:B
```

As discussed above, the embodiments are not limited to XML or DN-Value format, and that other formats may be used.

In an embodiment, resource description 206 defines an environment that is configured to transmit data according to replication logic description 204. Resource description 206 describes physical resources that publish and consume data in the replication path. Example physical resources that host one or more physical databases, file systems or message queues at data source 102 and replication database 106, servers, names and addresses of servers that host the one or more databases, names and addresses of the replication servers, port numbers, names and roles of users that have access to the servers, user login credentials, system settings, software applications, etc. For example, resource description 206 may include a server and database assigned to Publisher A and Subscriber B, the respective ports, and the user credentials that allow access to the Publisher A and Subscriber B. Additionally, the available CPU (central processing unit) power and memory space on the servers may also be included in resource description 206.

An example resource description 206 is replicated below:

```
SubSystem:mySys.Container:myRS
mySys.myRS.Naddr.HostName            "RepLinuxb3"
mySys.ASE:myDS.Naddr.HostName        "RepLinuxb4"
mySys.ASE:myDS.Naddr.port            "50000"
mySys.myDS.DB:myPDB.User             "pUser"
mySys.myDS.DB:myRDB.User             "rUser"
```

In an embodiment, binding connection 208 in RDM 202 describes physical binding between replication logic description 204 and resource description 206. For example, a publisher may be bound to a physical database, file system or a message queue that is data source 102, while a subscriber may be bound to a physical database that is replication database 106. Example binding connection 208 for the example resource description 206 and replication logic description 204 above is replicated below.

```
myRep.myData.myPub.Bind.DB       "mySys.myDS.myPDB"
myRep.myData.myPub.Bind.RS       "mySys.myRS"
myRep.myData.mySub.Bind.DB       "mySys.myDS.myRDB"
myRep.myData.mySub.Bind.RS       "mySys.myRS"
myRep.myData.A.TableFilter       "not temp*"
myRep.myData.A.Bind.DB           "mySys.myDS.myPDB"
myRep.myData.A.Bind.RS           "mySys.myRS.myCap"
myRep.myData.B.Bind.DB           "mySys.myDS.myRDB"
myRep.myData.B.Bind.RS           "mySys.myRS.myComp"
mySys.myRS.Naddr.HostName        "RepLinuxb3"
```

| | |
|---|---|
| mySys.myRS.Naddr.Port | "47000" |
| mySys.myRS.Configure.memSize | "20GB" |
| mySys.myRS.Configure.threadPool | "8" |
| mySys.myRS.myCap.CIReq | "mySys.myRS.CI.c001" |
| mySys.myRS.myCap.CIPro | "mySys.myRS.CI.c002" |
| mySys.myRS.myComp.CIReq | "mySys.myRS.CI.c002" |
| mySys.myRS.myComp.CIPro | "mySys.myRS.CI.c003" |
| mySys.myDS.Naddr.HostName | "RepLinuxb4" |
| mySys.myDS.Naddr.port | "50000" |
| mySys.myDS.DB:myPDB.User | "pUser" |
| mySys.myDS.DB:myRDB.User | "mUser" |

In an embodiment, replication logic description 204 is bound to multiple resource descriptions 206. In this way, a single replication logic description 204 may replicate data between multiple publishers and subscribers, as long as the multiple publishers and subscribers are mapped to different resource descriptions 206 and are bound using different binding connections 208.

Figure 3:
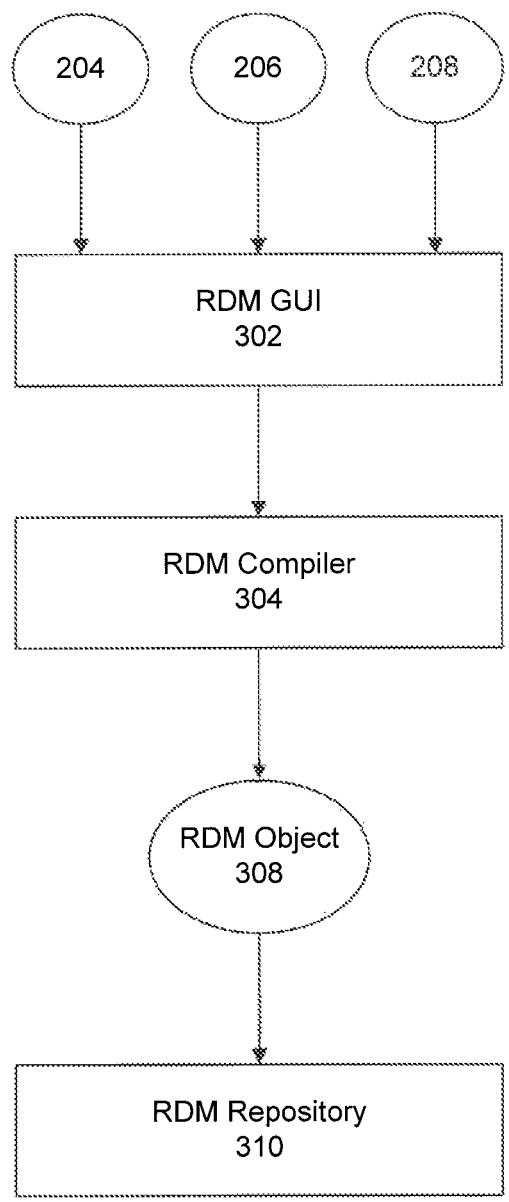
FIG. 3 is a block diagram of components where the replication description model may be implemented, according to an embodiment.

FIG. 3 is a block diagram 300 of components where the replication domain model may be implemented, according to an embodiment. RDM 202 includes an RDM graphical user interface or RDM GUI (graphical user interface) 302, an RDM compiler 304, and an RDM repository 310. As discussed in FIG. 3, RDM GUI 302, RDM compiler 304 and RDM repository 310 may execute within computer system in FIG. 5, which may be a standalone computer device or a server accessible to a computing device. The components, such as RDM objects 308 may then be uploaded to replication system 104, as discussed below.

A user can use RDM GUI 302 to provide input that defines replication logic description 204, resource description 206, and binding connection 208.

When the user input is received, RDM 202 submits replication logic description 204, resource description 206 and binding connection 208 to an RDM compiler 304, RDM compiler 304 compiles replication logic description 204, resource description 206 and binding connection 208 and generates RDM objects 308. RDM objects 308 encapsulate definitions with respect to how replication data should be included in replication logic description 204 with the environment described in resource description 206 and binding connection 208.

In an embodiment, RDM object 308 includes multiple attributes. The attributes can be set to the descriptions included in replication logic description 204, resource description 206 and binding connection 208 by RDM compiler 304.

In an embodiment, to submit replication logic description 204, resource descriptions 206 and binding connection 208 to RDM compiler 304, a user uses a SQL type language to provide system 100 user input for submitting the replication logic description 204, resource descriptions 206 and binding connection 208 to RDM compiler 304. For example, the user input may include issue commands such as:

| |
|---|
| Add begin "logical RDL" end |
| Add begin "subsystem" end |
| Add begin "binding" end |
| Commit |

Once committed, RDM compiler 304 generates RDM objects 308. RDM objects 308 describe a working replication system 104.

In an embodiment, RDM object 308 is modified by modifying one or more attributes. In one implementation, the RDM object 308 is modified using an application programming interface provided to each RDM object 308 at compilation time. For example, a user may modify the replication service, the data, the subscriber, or any of the attributes, such as binding between physical components, filters, etc. For example, a publisher may be added to RDM object 308 via user input using an "add" command or dropped from RDM object 308 via user input using a "drop" command. An attribute change in the replication service can be performed using a "set" command.

Once compiled, RDM objects 308 are stored in an RDM repository 310. RDM objects 308 can then be retrieved from RDM repository 310 and installed on a replication system 104. Once installed, RDM objects 308 cause physical components in system 104 to replicate data. The binding can set up a replication path between different servers that host data source 102 and replication database 106 within a network so that the data configured as described in FIG. 2 is able to flow along replication paths between the servers.

Figure 4:
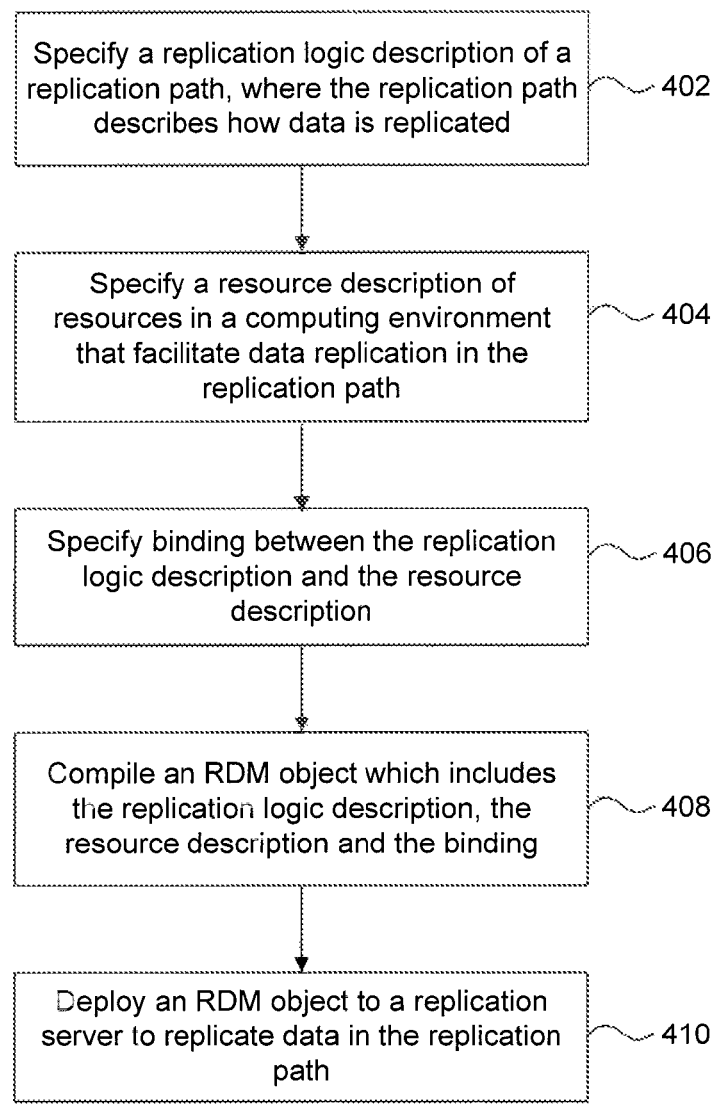
FIG. 4 is a flowchart of a method for specifying a replication environment, according to an embodiment.

FIG. 4 is a flowchart of a method 400 for specifying a replication environment, according to an embodiment. Method 400 is a cycle that can be performed recursively or portions of method 400 can be performed recursively to establish replication paths for data replication to replicate data. The life cycle in method 400 allows the initial definition of data that should be replicated in the replication path, on-going changes to the replication path and ultimate teardown of the replication path when replication is no longer to be used.

At step 402, a replication logic description is specified. For example, system 100 may receive user input from a user specifying a replication path that describes how data is replicated using replication logic description 204. The replication path can include transactions with data that is published using one or more publishers, such as databases, file systems and message queues and consumed using one or more subscribers, such as replication databases 106. As part of the replication path, data can include transactions that are changes to a particular table, multiple tables, changes to a database schema, operation changes, changes to files in a file system, updates to a particular topic in a message queue, etc. Replication logic description 204 can also include selectors and filters that allow publishers and subscribers to select and filter data in the replication path.

At step 404, a resource description is configured. For example, system 100 may receive user input from a user specifying resource description 206 that defines an environment that replicates data according to replication logic description 204. Resource description 206 describes physical resources that are mapped to a publisher and to a subscriber. Example physical resources include a physical environment comprising of servers, server addresses, server ports, server settings, software applications, user credentials and roles that access the servers. Additionally, available CPU power and memory space on the servers may also be included in resource description 206.

At step 406, a binding is specified. For example, system 100 may receive input from a user specifying binding connection 208 by mapping the logic replication description 204 of a replication path to resource description 206. In this step, a single logic replication description 204 of a replication path can be reused and bound to multiple physical servers that are components of multiple resource descriptions 206, and generated multiple replication paths between data source 102 and replication database 106.

At step 408, an RDM object is compiled. For example, RDM compiler 304 compiles the specified replication logic description 204, resource description 206 and binding connection 208 into RDM objects 308. As discussed above, RDM objects 308 include replication logic that can be used to subscribe to data at data source 102 on a physical server that is napped to the publisher. RDM objects 308 can also include replication logic used to consume data at replication database 106 on a physical server mapped to the subscriber.

At step 410, an RDM object is deployed. For example, RDM objects 308 may be deployed to replication system 104. On replication system 104, RDM objects 308 generate a replication path by configuring software and hardware components in data source 102 and replication database 106, and also configure data that requires replication. Once replication path is established, data source 102 is designated as a publisher and generates data consumed by replication database 106, which is designated as a subscriber, according to the logic described in replication logic description 204.

Computer System

Figure 5:
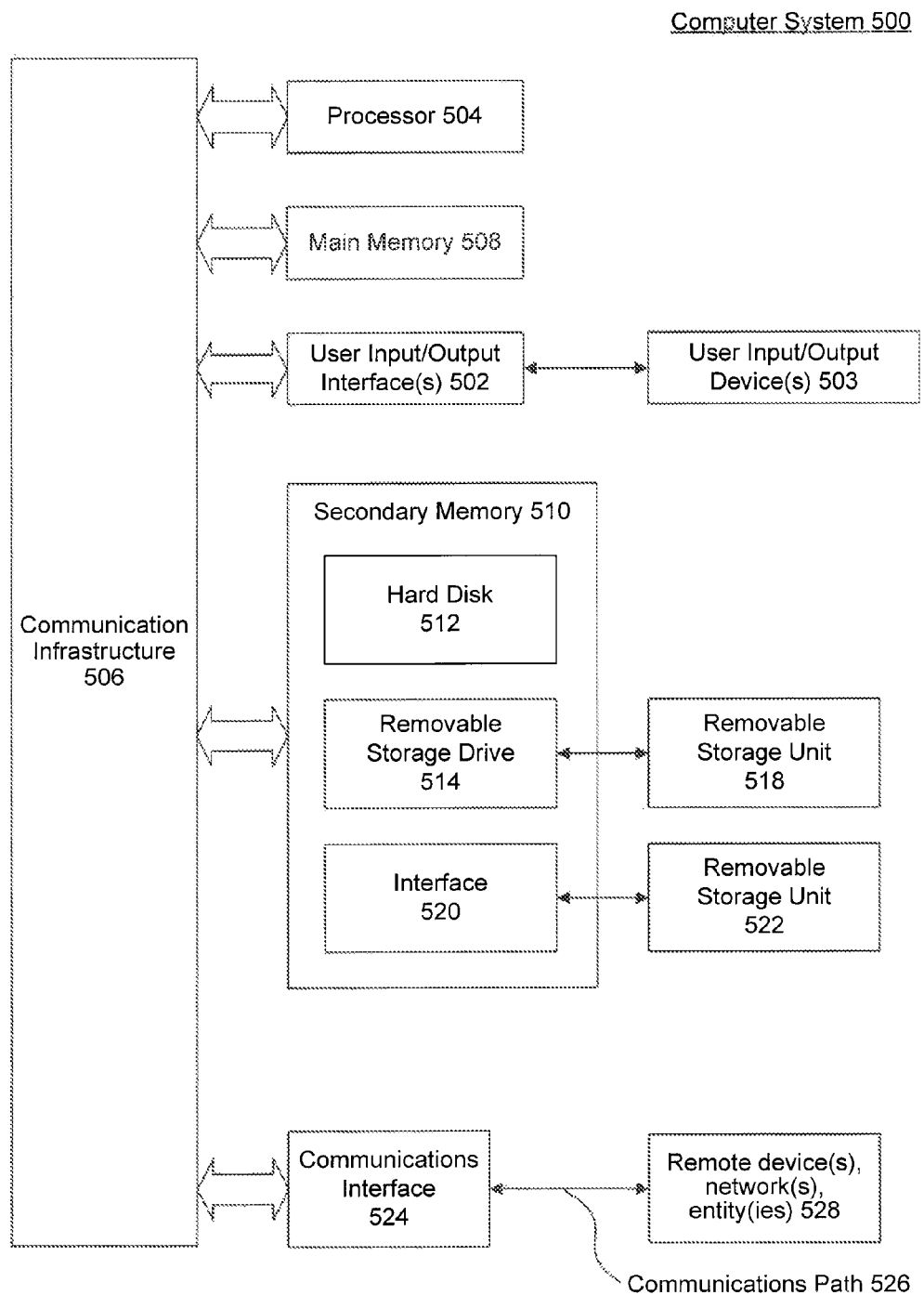
FIG. 5 is an example computer system in which embodiments of the invention can be implemented.

Various embodiments can be implemented, for example, using one or more well-known computer systems, such as computer system 500 shown in FIG. 5. Computer system 500 can be any well-known computer capable of performing the functions described herein, such as computers available from International Business Machines, Apple, Sun, HP, Dell, Sony, Toshiba, etc.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 500 also includes user input/output device(s) 503, such as monitors, keyboards, pointing devices, etc., which communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 5. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A method for replicating data, comprising:
    specifying a replication logic description of a replication path, wherein the replication path references a data source and a replication server related to replicating one or more transactions performed on the data source; wherein the one or more transactions include at least one change to a schema of the database;
    specifying a resource description that replicates the data including the one or more transactions using the replication path, wherein the resource description comprises an identification of a particular port on the data source and the replication server to use for replication;
    binding the replication logic description to the resource description; and
    compiling at least the replication logic description including the one or more transactions, the at least one change to the schema, the resource description, and the binding into an encapsulated replication object representing at least the bound replication logic description and the resource description, wherein the encapsulated replication object is deployed to an intermediate server in the computing environment that provides connectivity between the data source and the replication server and replicates the data, including the one or more transactions, according to at least the bound replication logic description and the resource description, and wherein replication using the object ensures transaction consistency and delivery during replication.

2. The method of claim 1, wherein specifying the replication logic description further comprises:
    specifying a publisher in the replication logic description, wherein the publisher is a logical source of the data in the replication path; and
    specifying a subscriber in the replication logic description, wherein the subscriber is a logical receiver of the data in the replication path.

3. The method of claim 2, wherein specifying the replication logic description further comprises:
    specifying a transformation logic associated with the publisher or the subscriber, wherein the transformation logic transforms a selected portion of the data in the replication path.

4. The method of claim 1, wherein specifying the resource description further comprises:
    deploying the object to replicate data of a database; and
    specifying physical resources in the replication path, wherein the physical resources store the data before and after the replication.

5. The method of claim 1, wherein the binding further comprises:
    mapping the replication logic description to at least one resource description, wherein the mapping maps a logical data flow of the replication path to at least one physical resource in a replication environment.

6. The method of claim 1, wherein specifying the replication logic description, the resource description, and the binding is performed using a structured language.

7. The method of claim 1, wherein specifying the replication logic description, the resource description, and the binding is defined using a distinguished names format (DN-value format).

8. The method of claim 1, wherein replicating the data using the generated object is part of a life-cycle that captures ongoing changes in a replication environment.

9. The method of claim 1, wherein one of the transactions comprises merging a first column of the database with a second column of the database within the schema.

10. The method of claim 1, further comprising:
    receiving, at a compilation time, a modification to the encapsulated replication object at least one of the replication logic description or the resource description via an application programming interface.

11. A system for replicating data in a database, comprising:
    a processor;
    a memory coupled to the processor and configured to store a replication description model (RDM), the RPM configured to:
        specify a replication logic description of a replication path, wherein the replication path references a data source and a replication server related to replicating one or more transactions performed on the data source wherein the one or more transactions include at least one change to a schema of the database;
        specify a resource description that replicates the data including the one or more transactions using the replication path, wherein the resource description comprises an identification of a particular port on the data source and the replication server to use for replication;
        bind the replication logic description to the resource description; and
        compile at least the replication logic description including the one or more transactions, the at least one change to the schema, the resource description, and the binding into an encapsulated replication object representing at least the bound replication logic description and the resource description, wherein the encapsulated replication object is deployed to an intermediate server in the computing environment that provides connectivity between the data source and the replication server and replicates the data, including the one or more transactions, according to at least the bound replication logic description and the resource description, and wherein replication using the object ensures transaction consistency and delivery during replication.

12. The system of claim 11, wherein the replication description logic specifies how the data is replicated in the replication path.

13. The system of claim 11, wherein to specify the replication logic description, the RDM is further configured to:
- specify a publisher in the replication logic description, wherein the publisher is a logical source of the data in the replication path; and
- specify a subscriber in the replication logic description, wherein the subscriber is a logical receiver of the data in the replication path.

14. The system of claim 13, wherein to specify the replication logic description, the RDM is further configured to:
- specify a transformation logic associated with the publisher or the subscriber, wherein the transformation logic transforms a selected portion of the data in the replication path.

15. The system of claim 11, wherein to specify the resource description, the RDM is further configured to:
- deploy the object to replicate data of a database; and
- specify physical resources in the replication path, wherein the physical resources store the data before and after the replication.

16. The system of claim 11, wherein to bind the replication logic description to the resource description the RDM is further configured to:
- map the replication logic description to at least one resource description, wherein the mapping maps a logical data flow of the replication path to at least one physical resource in a replication environment.

17. The system of claim 11, wherein specifying the replication logic description, the resource description, and the binding is performed using a structure language.

18. The system of claim 11, wherein specifying the replication logic description, the resource description, and the binding is defined using a DN-value format.

19. The system of claim 11, wherein replicating the data using the generated object is part of a life-cycle that captures ongoing changes in a replication environment.

20. A non-transitory tangible computer-readable device having instructions stored thereon that, when executed by at least one computing device, causes the at least one computing device to perform operations that replicate data, the operations comprising:
- specifying a replication logic description of a replication path, wherein the replication path references a data source and a replication server related to replicating one or more transactions performed on the data source wherein the one or more transactions include at least one change to a schema of the database;
- specifying a resource description that replicates the data including the one or more transactions using the replication path, wherein the resource description comprises an identification of a particular port on the data source and the replication server to use for replication;
- binding the replication logic description to the resource description; and
- compiling at least the replication logic description including the one or more transactions, the at least one change to the schema, the resource description, and the binding into an encapsulated replication object representing at least the bound replication logic description and the resource description, wherein the encapsulated replication object is deployed to an intermediate server in the computing environment that provides connectivity between the data source and the replication server and replicates the data; including the one or more transactions, according to at least the bound replication logic description and the resource description, and wherein replication using the object ensures transaction consistency and delivery during replication.

21. The non-transitory computer-readable device of claim 20, wherein the operations further comprise:
- specifying a publisher in the replication logic description, wherein the publisher is a logical source of the data in the replication path;
- specifying a subscriber in the replication logic description, wherein the subscriber is a logical receiver of the data in the replication path; and
- specifying physical resources in the replication path, wherein the physical resources store the data before and after replication.

* * * * *